(12) United States Patent
Zaccak et al.

(10) Patent No.: US 11,811,794 B2
(45) Date of Patent: Nov. 7, 2023

(54) PRIVACY INTERFACE FOR DATA LOSS PREVENTION VIA ARTIFICIAL INTELLIGENCE MODELS

(71) Applicant: Sharecare AI, Inc., Palo Alto, CA (US)

(72) Inventors: Gabriel Gabra Zaccak, Cambridge, MA (US); William Hartman, Nantucket, MA (US); Andrés Rodriguez Esmeral, Vancouver (CA); Devin Daniel Reich, Olympia, WA (US); Marina Titova, Menlo Park, CA (US); Brett Robert Redinger, Oakland, CA (US); Philip Joseph Dow, South Lake Tahoe, CA (US); Satish Srinivasan Bhat, Fremont, CA (US); Walter Adolf De Brouwer, Los Altos, CA (US); Scott Michael Kirk, Belmont, CA (US)

(73) Assignee: Sharecare AI, Inc., Palo Alto, CA (US)

( * ) Notice: Subject to any disclaimer, the term of this patent is extended or adjusted under 35 U.S.C. 154(b) by 256 days.

(21) Appl. No.: 17/319,025

(22) Filed: May 12, 2021

(65) Prior Publication Data
US 2021/0360010 A1 Nov. 18, 2021

Related U.S. Application Data

(60) Provisional application No. 63/023,854, filed on May 12, 2020.

(51) Int. Cl.
*H04L 9/40* (2022.01)
*G06N 20/20* (2019.01)

(52) U.S. Cl.
CPC ......... *H04L 63/1416* (2013.01); *G06N 20/20* (2019.01)

(58) Field of Classification Search
CPC ..... H04L 63/1416; G06N 20/20; G06N 20/00
(Continued)

(56) References Cited

U.S. PATENT DOCUMENTS 10,885,467 B2 * 1/2021 Park ..................... G06F 17/00
11,138,003 B2 * 10/2021 Glazer ............... G06F 9/44505
(Continued)

OTHER PUBLICATIONS

McMahan et al., A General Approach to Adding Differential Privacy to Iterative Training Procedures, arXiv, dated Mar. 4, 2019, 8 pages. [https://doi.org/10.48550/arXiv.1812.06210].
(Continued)

*Primary Examiner* — Badri Narayanan Champakesan
(74) *Attorney, Agent, or Firm* — HAYNES BEFFEL & WOLFELD LLP; Ernest J. Beffel, Jr.; Korbin S. Van Dyke

(57) ABSTRACT

The technology disclosed provides systems and methods related to preventing exfiltration of training data by feature reconstruction attacks on model instances trained on the training data during a training job. The system comprises a privacy interface that presents a plurality of modulators for a plurality of training parameters. The modulators are configured to respond to selection commands via the privacy interface to trigger procedural calls. The procedural calls modify corresponding training parameters in the plurality of training parameters for respective training cycles in the training job. The system comprises a trainer configured to execute the training cycles in dependence on the modified training parameters. The trainer can determine a performance accuracy of the model instances for each of the executed training cycles. The system comprises a differential privacy estimator configured to estimate a privacy guarantee for each of the executed training cycles in dependence on the modified training parameters.

19 Claims, 11 Drawing Sheets

(58) Field of Classification Search
USPC .......................................................... 726/23
See application file for complete search history.

(56) References Cited

U.S. PATENT DOCUMENTS 11,204,842 B2 * 12/2021 Protasov ............. G06F 11/1461
11,388,260 B2 *  7/2022 Kuflik .................... G06Q 30/02

OTHER PUBLICATIONS

Zhu et al., Deep Leakage from Gradients, arXiv, dated Dec. 19, 2019, 11 pages [arXiv:1906.08935v2].

Dwork, et al., "The Algorithmic Foundations of Differential Privacy", Foundations and Trends in Theoretical Computer Science (2014) vol. 9, Nos. 3-4, in 281 pages.

* cited by examiner

Example of Information Leakage Values as a function of Differential Privacy Parameters

| # Phones | # Sampled | Sigma | Clipping Threshold | Delta | Epsilon, 10 Rounds | Epsilon, 500 Rounds |
|---|---|---|---|---|---|---|
| 5000 | 100 | 0.0001 | 0.011 | $1e^{-05}$ | 2.18 | 4.54 |
| 5000 | 100 | 0.001 | 0.11 | $1e^{-05}$ | 2.18 | 4.54 |
| 5000 | 100 | 0.01 | 1.1 | $1e^{-05}$ | 2.18 | 4.54 |
| 10000 | 100 | 0.0001 | 0.013 | $1e^{-06}$ | 2.99 | 4.58 |
| 10000 | 100 | 0.001 | 0.13 | $1e^{-06}$ | 2.99 | 4.58 |
| 10000 | 100 | 0.01 | 1.3 | $1e^{-06}$ | 2.99 | 4.58 |

| | Model: | Phenomenal face | 305 |

General Info:

Rounds: 1      Total # users: 101400

307

Training History  221

| | Base | Round 1 |
|---|---|---|
| Epsilon | ... | 2.5 |
| Accuracy | 75% | 76.12% |
| Sample ratio | ... | 0.01 |
| Stddev (σ) | ... | 10e-2 |
| Sensitivity (S) | ... | 10 |
| Noise scale | ... | 10e-3 |
| Defendability against attacks | | |
| Model inversion | ✗ | ✗ |
| Member inference | ✗ | ✗ |
| Gradient leakage | ✗ | ✗ |

Training settings 281

Stddev (σ): 10e-2 —●—      Sample size: 100

Delta: 10e-5              Clipping: Global

[Update training]   [Pause/Resue training]   [Restart]

Published model   [Round 35]   [Set a model to publish]

Model: [Phenomenal face]

General Info:

Rounds: [0]    Total # users: [101400]

Training History

| | Base |
|---|---|
| Epsilon | ... |
| Accuracy | 75% |
| Sample ratio | ... |
| Stddev (σ) | ... |
| Sensitivity (S) | ... |
| Noise scale | ... |
| Defendability against attacks | |
| Model inversion | ✗ |
| Member inference | ✗ |
| Gradient leakage | ✗ |

Training settings

Stddev (σ): [10e-2] —●    Sample size: [100]

Delta [10e-5]    411    Clipping [Global]

[Update training]    [Start training]    [Restart]

Published model    [Round 35]    [Set a model to publish]

FIG. 4

Model: Phenomenal face

General Info:

Rounds: 1    Total # users: 101400

Training History

| | Base | Round 1 | Round 2 |
|---|---|---|---|
| Epsilon | ... | 2.5 | In progress |
| Accuracy | 75% | 76.12% | In progress |
| Sample ratio | ... | 0.01 | In progress |
| Stddev ($\sigma$) | ... | 10e-2 | In progress |
| Sensitivity (S) | ... | 10 | In progress |
| Noise scale | ... | 10e-3 | In progress |
| Defendability against attacks | | | |
| Model inversion | ✕ | ✕ | |
| Member inference | ✕ | ✕ | |
| Gradient leakage | ✕ | ✕ | |

Training settings

Stddev ($\sigma$): 10e-2    Sample size: 100

Delta 10e-5    Clipping Global

[Update training]    [Start training]    [Restart]

Published model    Round 35    [Set a model to publish]

Model: Phenomenal face

General Info:

Rounds: 1          Total # users: 101400

Training History

|  | Base | Round 1 |
|---|---|---|
| Epsilon | ... | 2.5 |
| Accuracy | 75% | 76.12% |
| Sample ratio | ... | 0.01 |
| Stddev (σ) | ... | 10e-2 |
| Sensitivity (S) | ... | 10 |
| Noise scale | ... | 10e-3 |
| Defendability against attacks | | |
| Model inversion | ✗ | ✗ |
| Member inference | ✗ | ✗ |
| Gradient leakage | ✗ | ✗ |

Training settings                    605

Updated Standard deviation → Stddev (σ): 10e-2 —●    Sample size: 100

Delta: 10e-5    Clipping: Global

610  [Update training]    [Start training]    [Restart]

Published model    [Round 35]    [Set a model to publish]

FIG. 6

Model: [Phenomenal face]

General Info:

Rounds: [100]    Total # users: [101499]

Training History

|  | Base | Round 1 | Round 2 | ... | Round 100 |
|---|---|---|---|---|---|
| Epsilon | ... | 2.5 | 3.11 | ... | 3.19 |
| Accuracy | 75% | 76.12% | 76.12% | ... | 75% |
| Sample ratio | ... | 0.01 | 0.01 | ... | 0.01 |
| Stddev ($\sigma$) | ... | 10e-2 | 10e-2 | ... | 10e-1 |
| Sensitivity (S) | ... | 10 | 10.1 | ... | 15 |
| Noise scale | ... | 10e-3 | 9.6e-4 | ... | 6.6e-3 |

Defendability against attacks

| Model inversion | ✗ | ✗ | ✓ | ... | ✓ |
|---|---|---|---|---|---|
| Member inference | ✗ | ✗ | ✗ | ... | ✓ |
| Gradiant leakage | 921 | 931 | 941 | ... | 951 |

Training settings

Stddev ($\sigma$): [10e-2] —●—    Sample size: [100]

Delta [10e-5]    Clipping [Global]

[Update training]    [Pause/Resue training]    [Restart]

Published model    [Round 35]    [Set a model to publish]

FIG. 9

PRIVACY INTERFACE FOR DATA LOSS PREVENTION VIA ARTIFICIAL INTELLIGENCE MODELS

PRIORITY APPLICATION

This application claims the benefit of U.S. Patent Application No. 63/023,854, entitled "PRIVACY INTERFACE FOR DATA LOSS PREVENTION VIA ARTIFICIAL INTELLIGENCE MODELS," filed May 12, 2020. The provisional application is incorporated by reference for all purposes.

INCORPORATIONS

The following materials are incorporated by reference as if fully set forth herein:

U.S. Provisional Patent Application No. 62/734,840, titled, "HASH-BASED EFFICIENT COMPARISON OF SEQUENCING RESULTS," filed Sep. 21, 2018;

U.S. Provisional Patent Application No. 62/734,872, titled, "BIN-SPECIFIC AND HASH-BASED EFFICIENT COMPARISON OF SEQUENCING RESULTS," filed Sep. 21, 2018;

U.S. Provisional Patent Application No. 62/734,895, titled, "ORDINAL POSITION-SPECIFIC AND HASH-BASED EFFICIENT COMPARISON OF SEQUENCING RESULTS," filed Sep. 21, 2018;

U.S. Nonprovisional patent application Ser. No. 16/816,153 titled, "SYSTEM AND METHOD WITH FEDERATED LEARNING MODEL FOR MEDICAL RESEARCH APPLICATIONS," filed Mar. 11, 2020;

U.S. Provisional Patent Application No. 62/942,644 titled, "SYSTEMS AND METHODS OF TRAINING PROCESSING ENGINES," filed Dec. 2, 2019;

U.S. patent application Ser. No. 17/109,118, titled, "SYSTEMS AND METHODS OF TRAINING PROCESSING ENGINES," filed Dec. 1, 2020;

U.S. Provisional Patent Application No. 62/883,070 titled, "ACCELERATED PROCESSING OF GENOMIC DATA AND STREAMLINED VISUALIZATION OF GENOMIC INSIGHTS," filed Aug. 5, 2019;

U.S. patent application Ser. No. 16/985,183, titled, "ACCELERATED PROCESSING OF GENOMIC DATA AND STREAMLINED VISUALIZATION OF GENOMIC INSIGHTS," filed Aug. 4, 2020;

U.S. Provisional Patent Application No. 62/975,177, titled, "ARTIFICIAL INTELLIGENCE-BASED DRUG ADHERENCE MANAGEMENT AND PHARMACOVIGILANCE," filed Feb. 11, 2020;

U.S. patent application Ser. No. 17/174,323, titled, "ARTIFICIAL INTELLIGENCE-BASED DRUG ADHERENCE MANAGEMENT AND PHARMACOVIGILANCE," filed Feb. 11, 2021;

U.S. Provisional Patent Application No. 62/810,549, titled, "SYSTEM AND METHOD FOR REMOTE MEDICAL INFORMATION EXCHANGE," filed Feb. 26, 2019;

U.S. patent application Ser. No. 16/802,485, titled, "SYSTEM AND METHOD FOR REMOTE MEDICAL INFORMATION EXCHANGE," filed Feb. 26, 2020;

U.S. Nonprovisional patent application Ser. No. 15/946,629, entitled "IMAGE-BASED SYSTEM AND METHOD FOR PREDICTING PHYSIOLOGICAL PARAMETERS," filed on Apr. 5, 2018;

U.S. Provisional Application No. 62/481,691, entitled "METHOD OF BODY MASS INDEX PREDICTION BASED ON SELFIE IMAGES," filed on Apr. 5, 2017;

U.S. Provisional Patent Application No. 62/883,639, titled "FEDERATED CLOUD LEARNING SYSTEM AND METHOD," filed on Aug. 6, 2019;

U.S. Provisional Patent Application No. 62/816,880, titled "SYSTEM AND METHOD WITH FEDERATED LEARNING MODEL FOR MEDICAL RESEARCH APPLICATIONS," filed on Mar. 11, 2019;

U.S. Provisional Patent Application No. 62/671,823, titled "SYSTEM AND METHOD FOR MEDICAL INFORMATION EXCHANGE ENABLED BY CRYPTO ASSET," filed on May 15, 2018; and U.S. Nonprovisional patent application Ser. No. 16/167,338, titled "SYSTEM AND METHOD FOR DISTRIBUTED RETRIEVAL OF PROFILE DATA AND RULE-BASED DISTRIBUTION ON A NETWORK TO MODELING NODES," filed on Oct. 22, 2018.

FIELD OF THE TECHNOLOGY DISCLOSED

The technology disclosed is related to application of machine learning techniques and determining data loss prevention when using machine learning models.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

A majority of applications these days use personal information to train machine learning models to provide efficient services to users. Such information can include sensitive personal data of users. The loss of data privacy is a major concern for users of such applications. To address these concerns, data privacy frameworks such as differential privacy (DP) have been developed with a hope for robust data privacy. The privacy frameworks, however, include a variety of parameters. Changing the value of any one of these parameters can impact many other parameters. The machine learning model owners or trainers face a challenge to understand the tensions between these parameters when selecting values of such parameters.

Accordingly, an opportunity arises to develop systems and methods to address the challenges of understanding the interrelationship between parameters and the impact of changing values of parameters in privacy frameworks on other parameters of the privacy framework or other model training parameters.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1B presents an example illustrating the impact on values of differential privacy parameters when values of selected parameters are changed.

FIG. 3 presents an initial state for the dashboard of FIG. 2.

FIG. 4 presents the start button on the dashboard to start training.

FIG. 5 presents an in-progress state on the dashboard during a training round.

FIG. 6 presents examples of updating privacy settings using the dashboard to take effect in the next training round.

FIG. 9 presents attacks against a predefined set of images displayed on the dashboard.

DETAILED DESCRIPTION

Figure 1A:
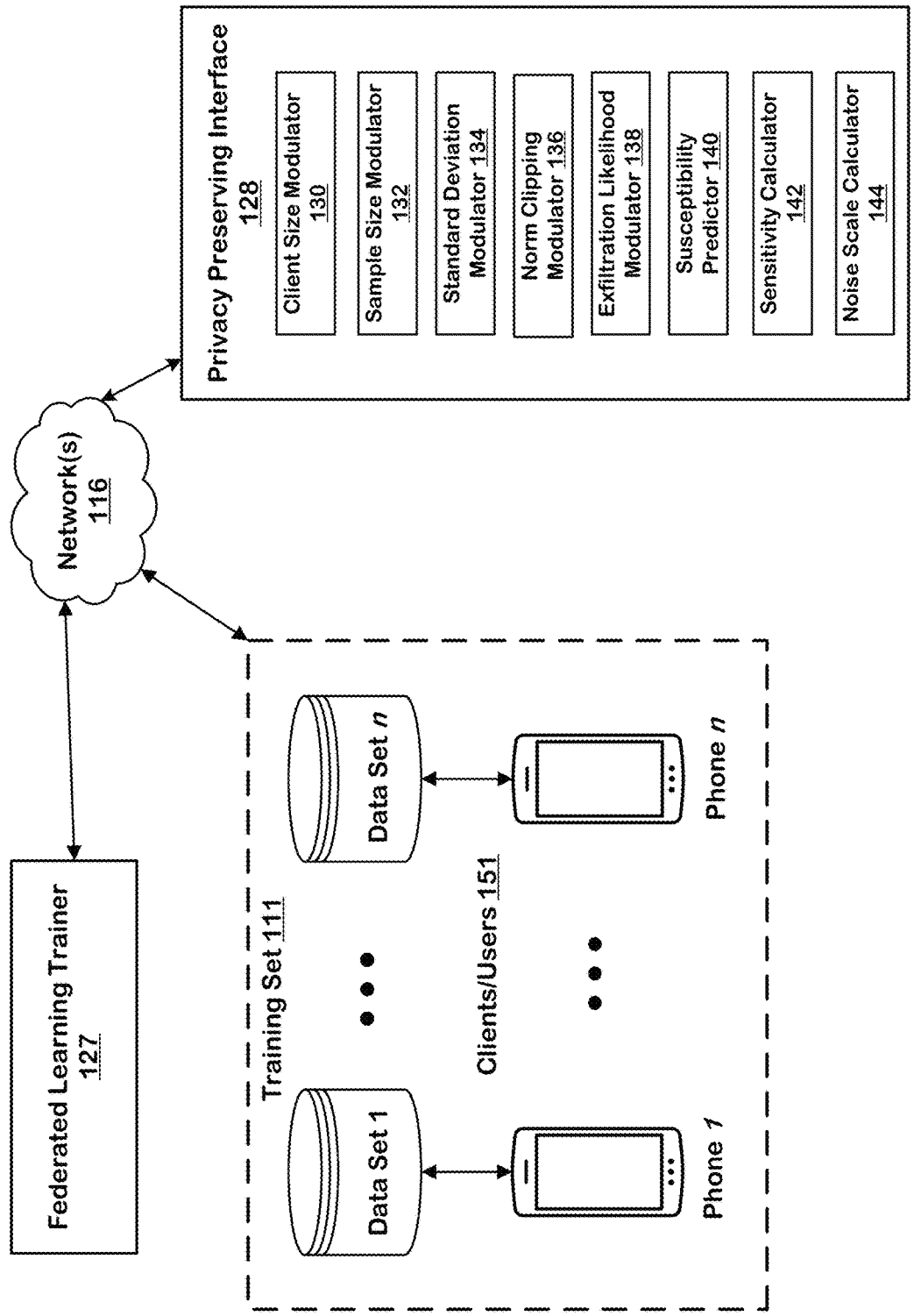
FIG. 1A shows an architectural level schematic of a system that includes a privacy-preserving interface to prevent exfiltration of training data.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

INTRODUCTION

We introduce various aspects of the technology disclosed. First an introduction to federated machine learning is presented. This is followed by a discussion of privacy-preserving machine learning. We then introduce the proposed system to manage various parameters of preserving privacy during the training of machine learning models.

Federated Learning

Traditionally, to take advantage of a dataset using machine learning, all the data for training had to be gathered to one place. However, as more of the world becomes digitized, this will fail to scale with the vast ecosystem of potential data sources that could augment machine learning (ML) models in ways limited only to the imagination. To solve this, we resort to federated learning ("FL").

A federated learning approach aggregates model weights across multiple devices without such devices explicitly sharing their data. However, the horizontal federated learning assumes a shared feature space, with independently distributed samples stored on each device. Because of the true heterogeneity of information across devices, there can exist relevant information in different feature spaces. In many scenarios such as these, the input feature space is not aligned across devices, making it extremely difficult to achieve the benefits of horizontal FL. If the feature space is not aligned, this results in two specific types of federated learning: vertical and transfer. The technology disclosed incorporates vertical learning to enable machine learning models to learn across distributed data silos with different features representing the same set of users. FL is a set of techniques to perform machine learning on distributed data—data which may lie in highly different engineering, economic, and legal (e.g., privacy) landscapes. In the literature, it is mostly conceived as making use of entire samples found across a sea of devices (i.e., horizontally federated learning), that never leave their home device. The ML paradigm remains otherwise the same.

Federated Cloud Learning ("FCL") is a vertical federated learning—a bigger perspective of FL in which different data sources, which are keyed to each other but owned by different parties, are used to train one model simultaneously, while maintaining the privacy of each component dataset from the others. That is, the samples are composed of parts that live in (and never leave) different places. Model instances only ever see a part of the entire sample, but perform comparably to having the entire feature space, due to the way the model stores its knowledge. This results in tight system coupling, but makes practical and practicable a Pandora's box of system possibilities not seen before.

Vertical federated learning (VFL) is best applied in settings where two or more data silos store a different set of features describing the same population, which will be hereafter referred to as the overlapping population (OP). Assuming the OP is sufficiently large for the specific learning task of interest, vertical federated learning is a viable option for securely aggregating different feature sets across multiple data silos.

Healthcare is one among many industries that can benefit from VFL. Users' data is fragmented between different institutions/organizations and departments. Most of these organizations or departments will never be allowed to share their raw data due to privacy regulations and laws. Even if we have access to such data, the data is not homogenous, and it cannot be combined directly into one ML model. Vertical federated learning (VFL) is a better fit to deal with heterogeneous data since it trains a joint model on encoded embeddings. VFL can leverage the private datasets or data silos to learn a joint model. The joint model can learn a holistic view of the users and create a powerful feature space for each user which trains a more powerful model. Maintaining privacy of a user's data is critical in federated learning. In the following section we present an example framework, referred to as Differential Privacy that can be used to achieve privacy and avoid data leakage. Technology disclosed provides a privacy-preserving interface that can help a model owner to manage various parameters to achieve a desired balance between data privacy and model performance.

Differential Privacy

The goal of privacy-preserving machine learning (ML) is to learn what people have in common across a dataset, while avoiding learning what makes people unique. We say that a phone's dataset is kept private when the parameters of the final model appear the same, independent of whether or not the phone participated in training. Notice, then, that the model learns nothing new or unique from the phone's dataset.

One way to define data privacy is that it is the right to control how information about an individual is being used, processed, stored, and shared. Differential Privacy (DP) describes a promise made by a data holder or curator to a data subject (owner) that, "You will not be affected adversely or otherwise, by allowing your data to be used in any study or analysis, no matter what other studies, datasets, or information sources are available". A formal definition of Differential Privacy is provided by Dwork et al. in their book "The Algorithmic Foundations of Differential Privacy" available at www.cis.upenn.edu/~aaroth/Papers/privacy-book.pdf. They define Differential Privacy as a randomized algorithm M with domain $\mathbb{N}^{|x|}$ is ($\varepsilon$, $\delta$-differentially private if for all S⊆Range (M) and for all x, $y \in \mathbb{N}^{|x|}$ such as $\|x-y\| \leq 1$:

$$Pr[M(x) \in S] \leq \exp(\varepsilon) Pr[M(y) \in S] + \delta \quad \text{Equation (1)}$$

In Equation (1), M is the randomized algorithm i.e., query (db)+noise or query (db+noise), S indicates all possible outputs of M that could be predicted, x are all the entries in the database (i.e., N), and y are all the entries in a parallel database (i.e., N−1), $\varepsilon$ is the maximum distance between a query on database (x) and the same query on database (y), $\delta$ is the probability of information accidently being leaked. This definition of differential privacy measures "how much privacy is afforded by a query?" It gives a comparison between running a query M on a database (x) and a parallel database (y) that has one entry less than the original database. The measure by which these two probabilities of random distribution of the full database (x) and the parallel database (y) can differ is given by epsilon ($\varepsilon$) and delta ($\delta$). We now present further details of these parameters.

It is possible to recover training data by analyzing a model's parameters without ever looking at the data itself. The model's potential for information leakage is measured by the variable, "epsilon". Epsilon provides clients a mathematical guarantee for the privacy of their data. If epsilon is zero, then there is no information loss, and the dataset is totally private. Epsilon is a measure of privacy loss at a differential change (i.e., adding or removing 1 entry) and is also known as the privacy parameter or the privacy budget. A smaller c will yield better privacy but a less accurate response. Small values of c require providing very similar outputs when given similar inputs, and therefore provide higher levels of privacy. Large values of allow less similarity in the outputs, and therefore provide less privacy.

Delta ($\delta$) is a probability of information accidentally being leaked. If $\delta=0$, we say that an output M is $\varepsilon$-differentially private. Epsilon ($\varepsilon$) is independent of the size of the database, whereas, in the case of delta ($\delta$), the chances of privacy leak may increase with the size of the database. Hence, ideally, we would want to set the $\delta$ value to be less than the inverse of the size of the database.

Differential privacy provides a framework for provable privacy protection against arbitrary adversaries while allowing the release of some statistics and potentially synthetic data. DP requires the introduction of additional randomness into the analysis such that the distribution of the output does not change substantially if one person were to be in the database or not. Differential privacy guarantees that whether an individual is in a database or not, the results of a DP procedure should be similar in terms of their probability distribution. This guarantee offers a sense of "plausible deniability" and limits the ability of an adversary to infer about any particular individual in the database. The strength of the privacy guarantee is characterized by the real value (epsilon) $\varepsilon > 0$, called the privacy-loss budget, where smaller values of c provide a stronger privacy guarantee.

The differential privacy can be defined as a randomized mechanism that satisfies ($\varepsilon$, $\sigma$)-differential privacy if for any two adjacent datasets X, X' that differ only by the addition or removal of a single unit, it produces outputs that are nearly indistinguishable. For machine learning applications the two most common cases are (1) example-level privacy in which an adversary cannot tell with high confidence from the learned model parameters whether a given examples was present in the training set, and (2) user-level privacy in which adding or removing an entire user's data from training set should not substantially impact the learned model. It is also possible to consider the datasets X, and X' as adjacent if they differ by replacing a training example (or an entire user's data) with another.

To implement privacy, we randomly perturb the model's parameters from their true state that is learned from the data. It is impossible to tell which components of the parameters have been learned, versus what is noise. This obfuscates the data's signal that has been encoded in the model's parameters, and provides clients with plausible deniability. Sigma ($\sigma$) is the standard deviation of the noise added to the data signal. As we add more noise, the phone's dataset becomes more private, and thus epsilon (the information leakage) decreases. The randomness may also be thought of as a form of regularization, where the model avoids overfitting to any one phone's data.

In addition to the parameters for differential privacy presented above, there are many other training parameters that need to be adjusted such as the number of users (or clients), the number of samples in each training round, etc. The technology disclosed provides a privacy-preserving interface that allows the model owner or model trainer to adjust the parameters and observe the impact of such changes on other parameters. A slight change in one training parameter can negatively impact many other training parameters and thus model performance and data privacy. Without the interface provided by the technology disclosed, it is difficult for a model trainer to observe impact of changes in training parameters on the model's performance and the level of data privacy.

Environment

Many alternative embodiments of the present aspects may be appropriate and are contemplated, including as described in these detailed embodiments, though also including alternatives that may not be expressly shown or described herein but as obvious variants or obviously contemplated according to one of ordinary skill based on reviewing the totality of this disclosure in combination with other available information. For example, it is contemplated that features shown and described with respect to one or more embodiments may also be included in combination with another embodiment even though not expressly shown and described in that specific combination.

For the purpose of efficiency, reference numbers may be repeated between figures where they are intended to represent similar features between otherwise varied embodiments, though those features may also incorporate certain differences between embodiments if and to the extent specified as such or otherwise apparent to one of ordinary skill, such as differences clearly shown between them in the respective figures.

We describe a system 100 for preventing exfiltration of training data for Federated Learning (FL). The system is described with reference to FIG. 1A showing an architectural level schematic of a system in accordance with an implementation. Because FIG. 1A is an architectural diagram, certain details are intentionally omitted to improve the clarity of the description. The discussion of FIG. 1A is organized as follows. First, the elements of the figure are described, followed by their interconnection. Then, the use of the elements in the system is described in greater detail.

FIG. 1A includes the system 100. This paragraph names labeled parts of the system 100. The figure includes a training set 111, devices of users (clients) 151, a federated learning trainer 127, a privacy-preserving interface 128, and a network(s) 116. The network(s) 116 couples the training set 111, devices 151, the federated learning trainer 127, and the privacy-preserving interface 128. The training set 111 can comprise multiple datasets labeled as dataset 1 through dataset n. Training data sets 1 to n can reside on devices 1 to n, respectively. Examples of data can include data related to the health or fitness of users, financial data or other personal data related to users. Training data can include images such as facial images and other types of data. The clients 151 can be computing devices or edge devices such as mobile computing devices, phones, or embedded computing systems, etc.

A federated cloud learning (FCL) trainer 127 includes the components to train processing engines. A privacy-preserving interface 128 can include a client size modulator 130, a sample size modulator 132, a standard deviation modulator 134, a norm clipping modulator 136, an exfiltration likelihood modulator 138, a susceptibility predictor 140, a sensitivity calculator 142, and a noise scale calculator 144. The privacy-preserving interface can include other modulators or controls in addition to those listed above. We present details of the components of the privacy-preserving interface 128 in the following sections.

Completing the description of FIG. 1A, the components of the system 100, described above, are all coupled in communication with the network(s) 116. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, and/or Internet, inclusive of the mobile Internet, via protocols such as EDGE, 3G, 4G LTE, Wi-Fi, and WiMAX. The engines or system components of FIG. 1A are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications. We now present details of the system components of the privacy-preserving interface.

System Components of Privacy Preserving Interface

The technology disclosed includes a system for preventing exfiltration of training data by feature reconstruction attacks on model instances trained on the training data during a training job. The system comprises a privacy interface that presents a plurality of modulators for a plurality of training parameters. The modulators can be configured to respond to selection commands via the privacy interface to trigger procedural calls that modify corresponding training parameters in the plurality of training parameters for respective training cycles in the training job.

The system comprises a trainer configured to execute the training cycles in dependence on the modified training parameters. The trainer can determine a performance accuracy of the model instances for each of the executed training cycles. The system comprises a differential privacy estimator configured to estimate a privacy guarantee for each of the executed training cycles in dependence on the modified training parameters. The system comprises a feedback provider configured to visualize, on the privacy interface, the privacy guarantee, the performance accuracy, and the modified training parameters for each of the executed training cycles.

We now present examples of modulators that can be used to adjust the training parameters. An example modulator is a client size modulator 130 that can be used to adjust the number of users to include in the training data set for a training cycle. Another example modulator is a sample size modulator 132 that can be used to adjust the number of training examples for use in a particular training cycle.

The system can comprise a standard deviation modulator 134 configured to receive as input a sigma value that specifies a standard deviation of additive noise to use for the execution of the particular training cycle. The system can also include modulators to specify sigma values for different layers of the machine learning model. A different sigma value can be specified for each layer of the model in particular training cycles. A standard deviation modulator is further configured to trigger a procedure call that causes the trainer to execute the particular training cycle with model instances whose weights are randomly perturbed in dependence on the additive noise. Examples of additive noise can include Laplacian noise, or Gaussian noise, etc.

The sensitivity of a function $f$ is the amount $f$'s output changes when its input changes by 1. The L1 sensitivity of a function gives an upper bound on how much we must perturb its output to preserve privacy. The L1 sensitivity of a function $f$ captures the magnitude by which a single individual's data can change the function $f$ in the worst case. Therefore, it indicates the uncertainty or noise to be added in response to hide the participation of a single individual.

Laplace distribution is a symmetric version of exponential distribution. The Laplace mechanism adds noise from a symmetric continuous distribution to the true answer. The Gaussian noise adding mechanism works similar to the Laplace mechanism. L1 sensitivity is required for the Laplace mechanism whereas either L1 or L2 sensitivity can work for the Gaussian mechanism. For applications in which L2 sensitivity is lower than L1 sensitivity, the Gaussian mechanism allows the addition of much less noise in comparison to the Laplace mechanism.

The L1 norm of a vector is defined as the sum of the vector's elements. In a 2-dimensional space, the L1 norm of the difference between two vectors yields the Manhattan distance between them. The L2 norm of a vector of length k is defined as the square root of the sum of the squares. In a 2-dimensional space, it is the Euclidean distance which is always less than or equal to the L1 distance.

The technology disclosed can include the clipping of gradients to obtain privacy when a machine learning model is trained using stochastic gradient descent. In such an implementation, the system includes a norm clipping modulator 136 configured to receive as input a gradient norm bound value that specifies a clipping threshold to use for the execution of the particular training cycle. The system can include a plurality of norm clipping modulators to specify respective gradient norm bound values for respective layers of the model instances.

The system can include an exfiltration likelihood modulator 138 that can receive as input a delta ($\delta$) value that specifies a probability of the exfiltration likelihood exceeding the privacy guarantee during the execution of the particular training cycle. The delta value can indicate the probability of failure or loss we can afford in differential privacy.

The system can comprise a susceptibility predictor 140 that can determine the susceptibility of the model instances to feature reconstruction attacks. Examples of feature reconstruction attacks can include model inversion attacks, member inference attacks, and gradient leakage attacks. Generative Adversarial Networks or GANs are examples of machine learning models that can automatically discover and learn the regularities or patterns in input data in such a way that the model can be used to generate or output new examples that plausibly could have been drawn from the original dataset.

The system can comprise a sensitivity calculator 142 configured to calculate a model sensitivity value for each of the executed training cycles in dependence on the modified training parameters. Sensitivity refers to the impact a change in the underlying dataset can have on the result of the query. A sensitivity calculator can determine how much noise perturbation is required in the DP mechanism. Sensitivity can be stated both in a global and local context. Global sensitivity refers to the consideration of all possible data sets differing in at most one element. Local sensitivity refers to a change in one data set with at most one element differing. The system can comprise a feedback provider that is further configured to visualize the model sensitivity value for each of the executed training cycles.

The system can comprise a noise scale calculator 144 configured to calculate a noise scale value for each of the executed training cycles in dependence on the modified training parameters. The system can include a feedback provider that is further configured to visualize the noise scale value for each of the executed training cycles.

The system can comprise an update training command generator that is responsive to the selection commands and is configured to trigger a procedural call that causes the trainer to execute the training cycles in dependence on the modified training parameters. The system can comprise an update training command generator that is responsive to the selection commands and is configured to trigger a procedural call that causes the trainer to pause and resume the training cycles. The system can comprise a restart training command generator that is responsive to the selection commands and is configured to trigger a procedural call that causes the trainer to restart the training cycles. The system can comprise a model publish command generator that is responsive to the selection commands and is configured to trigger a procedural call that causes the trainer to deploy the model instances to the available clients after the training cycles.

FIG. 1B presents an analysis of how different differential privacy conditions can affect a model's information leakage. The analysis presents tensions between various parameters. For example, it can identify the relationship between sensitivity and noise levels to achieve a meaningful privacy guarantee. The table 101 in FIG. 1B presents the results of an epsilon calculator that accepts training parameters as input and returns the table of privacy guarantees. For accounting purposes we have used Renyi Differential Privacy in TensorFlow privacy. The calculation method is adapted from McMahan et. al. 2019 available at <arxiv.org/abs/1812.06210>. The table 101 shows information leakage (epsilon) as a function of the following parameters.

Phones indicating the number of phones or number of users

Samples indicating the number of phones sampled per training round

Sigma indicating additive noise (values range from 0.0001 to 0.01)

S is the clipping threshold which is important for sensitivity

Delta is the probability of failure

Number of Training Rounds

The first five columns of table 101 are differential privacy parameters and the final two columns are the resulting values of epsilon after 10 and 500 training rounds, respectively. To study the tension between sigma and sensitivity (clipping threshold), values of all other parameters are fixed at their expected conditions. It can be seen that many values of sigma and S pairs can achieve the same privacy guarantee (epsilon upper bound) as long as the ratio (sigma over S) is constant.

This result shows that theoretically we can achieve any value of epsilon with any value of S, as long as we add the right amount of noise. To narrow these values for sigma and S, we can experiment with them using the privacy-preserving interface ensuring we use the proper ratio for desired privacy guarantees. The calculator can be run on a tighter set of sigma's and S's for a tradeoff between privacy and accuracy and for different training conditions. We now present a user interface example for a privacy-preserving interface in the following figures to illustrate how it can be used to set values of various parameters and observe their impact on other parameters during training rounds.

Figure 2:
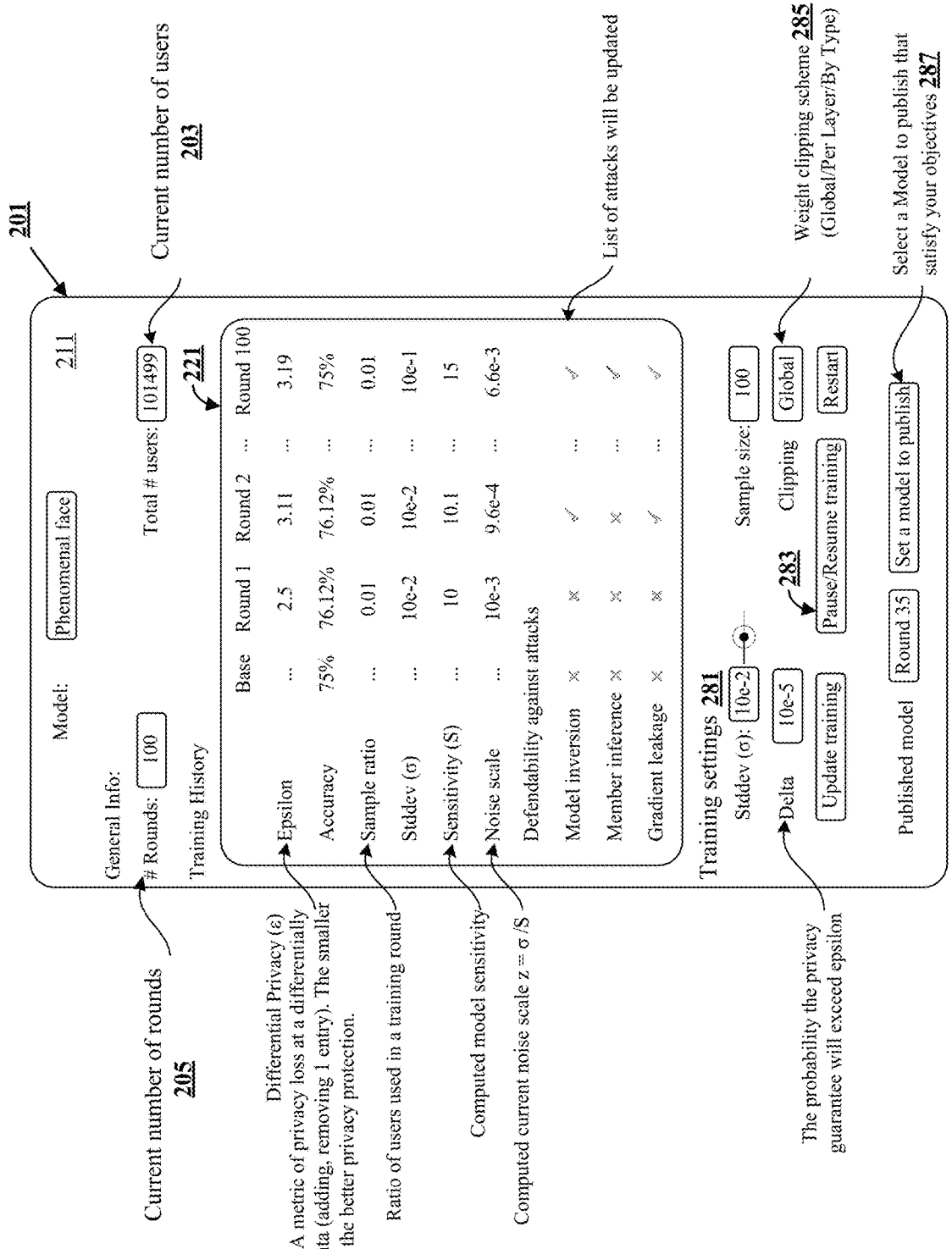
FIG. 2 presents an illustration of a dashboard design for status and configuration of a training job for a model owner.

FIG. 2 presents an example dashboard 201 for a privacy-preserving interface that describes the status and configuration of a training job for a model owner. In case training is performed using federated learning, the top section 211 lists the current total number of users/clients (203) and the number of elapsed rounds of training (205). The middle table 221 displays various metrics including epsilon, the privacy loss. The model owner can use the table to decide on the best privacy, accuracy/performance, and defendability tradeoffs for his organization and clients. The model owner can also switch from a table to a graph view.

The bottom part of the dashboard presents a "training settings" section 281. In the training settings section 281, the model owner can set privacy settings for the training job. For example, he can set the standard deviation of noise, sample size of users, probability of failure of epsilon-Differential Privacy (privacy loss), weight clipping scheme, and similar parameters when applicable.

The model owner can change the settings and click the "update training" button. He can click on the "Pause/Resume training" button 283 to pause or continue the training job or he can click on the "restart" button to restart the training if it does not align with his objectives. In the training settings section, the model owner can decide to publish a model that he prefers after inspecting the values from the table above that will be used for inference for his users/clients. He can choose a specific model or choose "last" to use the same model for training and inference. In the following figures, we present various scenarios of the dashboard in different states. Similarly, the model owner can select a weight clipping scheme such as global, per layer, or by type, etc. using the button 285. The user can also select a model to publish using a button 287.

FIG. 3 presents an initial state 301 of the dashboard of FIG. 2. In the top portion, the dashboard indicates the start of training by presenting "#Rounds: 1" which can inform the model owner that the training of the model has started. Other parameter values such as the model name "Phenomenal Face" (305) and total number of users "101400" (307) are also presented for the information of the model owner. The middle table (221) shows results for various parameters such as epsilon, accuracy, sample ratio, standard deviation (sigma), sensitivity (S), noise scale, etc.

The bottom portion of the dashboard presents the training settings 281 for the initial state including a slider scale for adjusting the values of the standard deviation (sigma), sample size, delta, and clipping parameters.

FIG. 4 presents a state 401 of the dashboard of FIG. 2 which can be used by the model owner to start the training. The model owner can press a button "start training" 411 to start the training of the model using the parameters set using the dashboard.

FIG. 5 presents a start 501 of the dashboard of FIG. 2 which illustrates that the training of the model is in progress. As it can be seen in the middle table 221, the user interface shows "in progress" for the current training round (i.e., round 2) for various training parameters listed in the middle table 221.

FIG. 6 shows updates to privacy settings in the training settings section of the dashboard (601). For example, the standard deviation value can be adjusted using the slider scale 605. The updated privacy settings are used for the next training round of the model. The model owner can press the update training button 610 to update the training settings.

Figure 7:
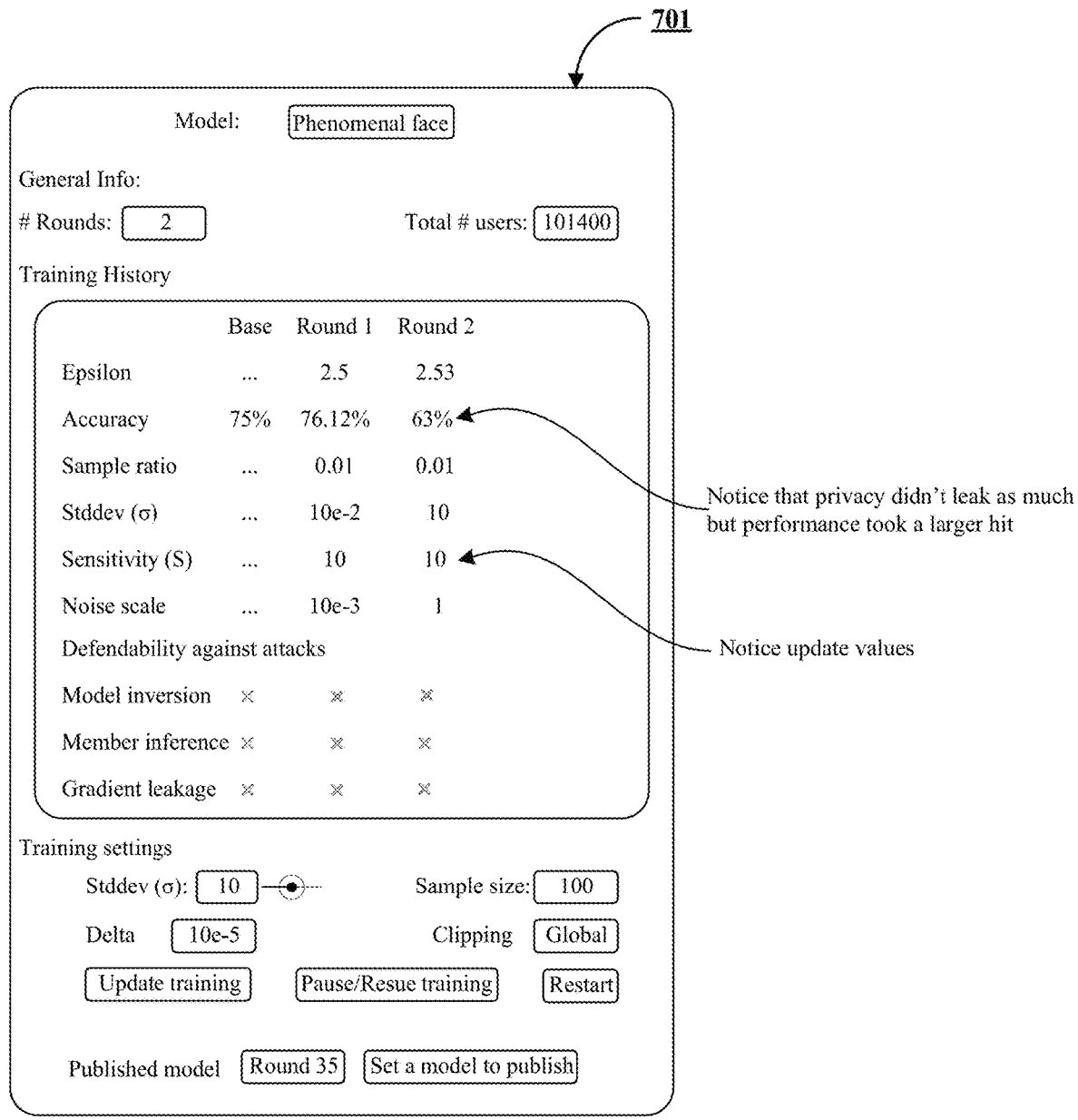
FIG. 7 presents results received after the training round with the updated privacy settings of FIG. 6.

FIG. 7 shows the updated results from the training round after privacy settings have been updated (701). For example, the updated standard deviation value in FIG. 6 results in updates to various parameters as shown in FIG. 7. Note that the standard deviation value is increased from $10e^{-2}$ to 10. The update results in a reduction of accuracy to 63% from 76.12% from round 1. The value of epsilon is increased to 2.53 from 2.5. As we can see, the decrease in accuracy is more than the increase in epsilon as a result of the updated standard deviation.

Figure 8:
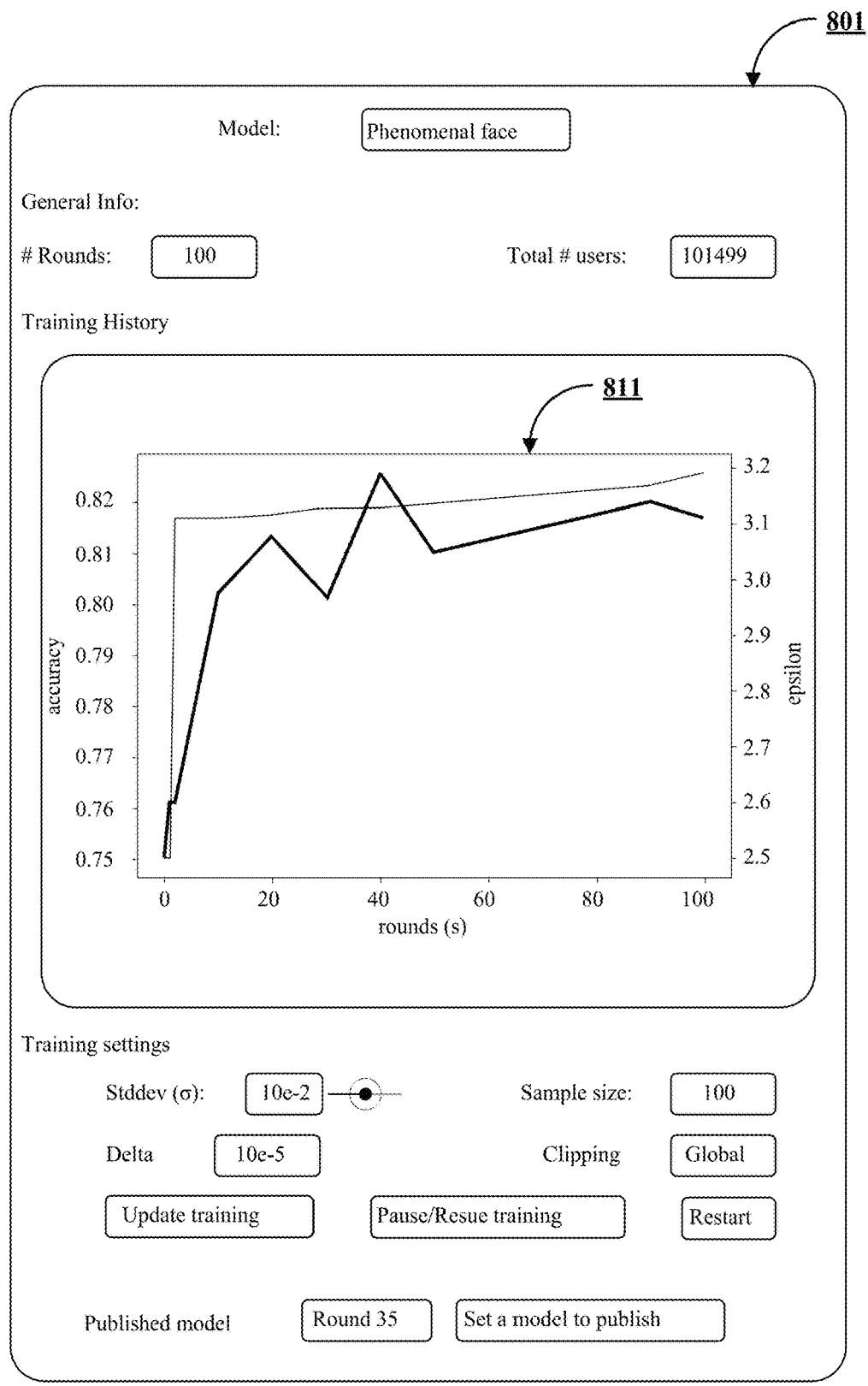
FIG. 8 presents a graphical view of training history on the dashboard.

FIG. 8 presents a view 801 that presents the results of the training round in a graphical form. The example graph 811 shows the values of accuracy and epsilon over one hundred training rounds. It can be seen that as the value of epsilon is gradually increased above 31, the accuracy increases to 0.815 in approximately $90^{th}$ training round. Beyond, the $90^{th}$ training round as the value of the epsilon increases, the accuracy decreases. Therefore, using the graphical view of the dashboard, the model owner can visualize the optimal combination of different parameter values for a training data set.

FIG. 9 shows an illustration 901 of attacks against a pre-defined set of images as shown on the user interface of the dashboard of FIG. 2. FIG. 9 shows the model's defendability against attacks. For example, the images 921, 931, 941, and 951 show gradient leakage across multiple training rounds. The gradient leakage is at a maximum at image 921 but it gradually decreases as noise is increased over multiple training rounds. Gradient leakage is minimized and is shown by a hatch pattern completely covering the image 951 for training round 100. Therefore, the privacy-preserving interface shows the model training provides defense against model inversion and member inference attacks by displaying checkmarks in the column for training round 100. Therefore, the technology disclosed provides a detailed performance analysis to the model owner for each training round with respect to the privacy of a user's data.

Particular Implementations

The technology disclosed is related to preventing exfiltration of training data by feature reconstruction attacks on model instances trained on the training data during a training job.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The technology disclosed can be practiced as a system that includes one or more processors coupled to memory. The memory is loaded with computer instructions to prevent exfiltration of training data by feature reconstruction attacks on model instances trained on the training data during a training job. The system comprises a privacy interface that presents a plurality of modulators for a plurality of training parameters. The system comprises modulators in the plurality of modulators configured to respond to selection commands via the privacy interface. The modulators trigger procedural calls that modify corresponding training parameters in the plurality of training parameters for respective training cycles in the training job. The system comprises a trainer configured to execute the training cycles in dependence on the modified training parameters, and determine a performance accuracy of the model instances for each of the executed training cycles. The system comprises a differential privacy estimator configured to estimate a privacy guarantee for each of the executed training cycles in dependence on the modified training parameters. The system comprises a feedback provider configured to visualize, on the privacy interface, the privacy guarantee, the performance accuracy, and the modified training parameters for each of the executed training cycles.

This system and other implementations of the technology disclosed can include one or more of the following features. In the interest of conciseness, the combinations of features disclosed in this application are not individually enumerated and are not repeated with each base set of features. Features applicable to methods, systems, and articles of manufacture are not repeated for each statutory class set of base features. The reader will understand how features identified in this section can readily be combined with base features in other statutory classes.

The modulators can include a client size modulator configured to receive as input a client size value that specifies a number of available clients to use for the execution of a particular training cycle in the training job. The client size modulator can be further configured to trigger a procedure call that causes the trainer to execute the particular training cycle with as many of the model instances as the number of available clients.

The modulators include a sample size modulator configured to receive as input a sample size value that specifies a subset of the available clients to use for the execution of the particular training cycle. The sample size modulator is further configured to trigger a procedure call that causes the trainer to execute the particular training cycle with only those model instances that are deployed on the subset of the available clients.

The modulators can include a standard deviation modulator configured to receive as input a sigma value that specifies a standard deviation of additive noise to use for the execution of the particular training cycle. The standard deviation modulator is further configured to trigger a procedure call that causes the trainer to execute the particular training cycle with model instances whose weights are randomly perturbed in dependence on the additive noise. The additive noise can be a Gaussian noise or a Laplacian noise.

The modulators can include a plurality of standard deviation modulators to specify respective sigma values for respective layers of the model instances.

The modulators can include a norm clipping modulator configured to receive as input a gradient norm bound value that specifies a clipping threshold to use for the execution of the particular training cycle. The norm clipping modulator can be further configured to trigger a procedure call that causes the trainer to execute the particular training cycle with model instances whose gradients are bounded in dependence on the clipping threshold.

The modulators can include a plurality of norm clipping modulators to specify respective gradient norm bound values for respective layers of the model instances.

In one implementation, the method includes registering the characteristic identity vector with an identity server. The characteristic identity vector can be accompanied by a photograph of the user that becomes one of the plurality of face images used to compute the characteristic identity vector.

The modulators can include an exfiltration likelihood modulator configured to receive as input a delta value that specifies a probability of the exfiltration likelihood exceeding the privacy guarantee during the execution of the particular training cycle. The exfiltration likelihood modulator is further configured to trigger a procedure call that causes the trainer to execute the particular training cycle with model instances whose weights are modified in dependence on the probability.

In one implementation, the system is configured to comprise a susceptibility predictor that can determine, in dependence on the modified training parameters, susceptibility of the model instances to the feature reconstruction attacks. The feature reconstruction attacks can include model inversion attacks, member inference attacks, and gradient leakage attacks.

The feedback provider is further configured to visualize the susceptibility of the model instances to the feature reconstruction attacks on the privacy interface.

In one implementation, the system is further configured to comprise a sensitivity calculator configured to calculate a model sensitivity value for each of the executed training cycles in dependence on the modified training parameters.

The feedback provider can be further configured to visualize the model sensitivity value for each of the executed training cycles.

In one implementation, the system is further configured to comprise a noise scale calculator configured to calculate a noise scale value for each of the executed training cycles in dependence on the modified training parameters.

The feedback provider is further configured to visualize the noise scale value for each of the executed training cycles.

The privacy interface is further configured to comprise an update training command generator that is responsive to the selection commands. The update training command generator is configured to trigger a procedural call that causes the trainer to execute the training cycles in dependence on the modified training parameters.

The privacy interface is further configured to comprise an update training command generator that is responsive to the selection commands. The update training command generator is configured to trigger a procedural call that causes the trainer to pause and resume the training cycles.

The privacy interface is further configured to comprise a restart training command generator that is responsive to the selection commands and is configured to trigger a procedural call that causes the trainer to restart the training cycles.

The privacy interface is further configured to comprise a model publish command generator that is responsive to the selection commands and is configured to a trigger a procedural call that causes the trainer to deploy the model instances to the available clients after the training cycles.

Aspects of the technology disclosed can be practiced as a method of preventing the exfiltration of training data by feature reconstruction attacks on model instances trained on the training data during a training job. The method includes presenting a plurality of modulators for a plurality of training parameters. The method includes responding to a selection of modulators in the plurality of modulators to trigger procedural calls that modify corresponding training parameters in the plurality of training parameters for respective training cycles in the training job. The method includes executing the training cycles in dependence on the modified training parameters. The method includes determining a performance accuracy of the model instances for each of the executed training cycles. The method includes estimating a privacy guarantee for each of the executed training cycles in dependence on the modified training parameters. The method includes providing feedback visualization for the privacy guarantee, the performance accuracy, and the modified training parameters for each of the executed training cycles.

The method implementation can incorporate any of the features of the system described immediately above or throughout this application that apply to the method implemented by the system. In the interest of conciseness, alternative combinations of method features are not individually enumerated. Features applicable to systems, methods, and articles of manufacture are not repeated for each statutory class set of base features. The reader will understand how features identified in this section for one statutory class can readily be combined with base features in other statutory classes.

Other implementations may include a non-transitory computer readable storage medium storing instructions executable by a processor to perform functions of the system described above. Yet another implementation may include a method performing the functions of the system described above.

As an article of manufacture, rather than a method, a non-transitory computer readable medium (CRM) can be loaded with program instructions executable by a processor. The program instructions, when executed, implement the computer-implemented method described above. Alternatively, the program instructions can be loaded on a non-transitory CRM and, when combined with appropriate hardware, become a component of one or more of the computer-implemented systems that practice the method disclosed.

Each of the features discussed in this particular implementation section for the method implementation apply equally to CRM implementation. As indicated above, all of the method features are not repeated here, in the interest of conciseness, and should be considered repeated by reference.

Computer System

Figure 10:
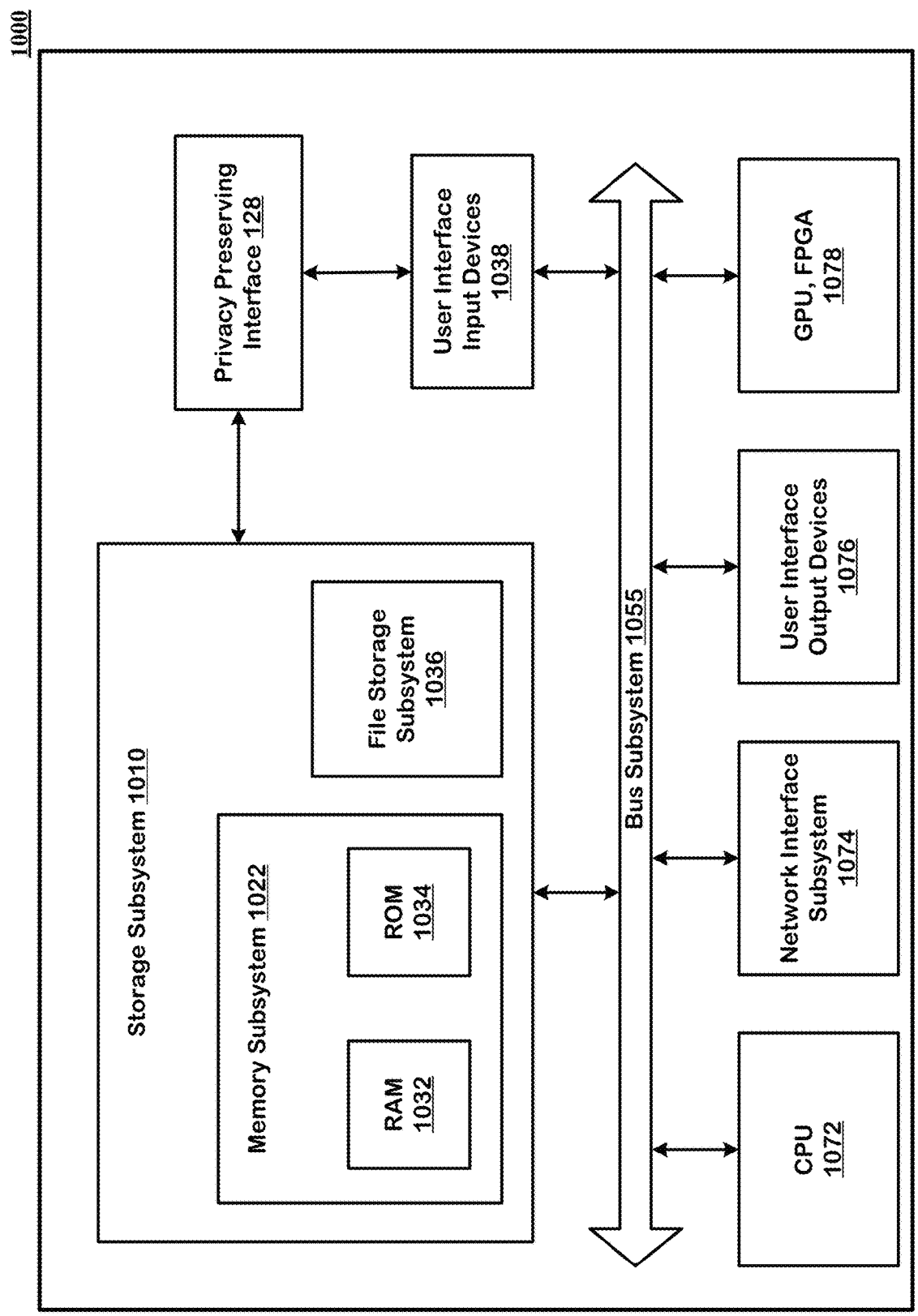
FIG. 10 is a simplified block diagram of a computer system that can be used to implement the technology disclosed.

A computer-implemented method implementation of the technology disclosed includes the Computer System 1000 as shown in FIG. 10.

FIG. 10 is a simplified block diagram of a computer system 1000 that can be used to implement the technology disclosed. The computer system 1000 includes at least one central processing unit (CPU) 1072 that communicates with a number of peripheral devices via bus subsystem 1055. These peripheral devices can include a storage subsystem 1010 including, for example, memory devices and a file storage subsystem 1036, user interface input devices 1038, user interface output devices 1076, and a network interface subsystem 1074. The input and output devices allow user interaction with the computer system 1000. The network interface subsystem 1074 provides an interface to outside networks, including an interface to corresponding interface devices in other computer systems.

In one implementation, the privacy-preserving interface 128 is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into the computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from the computer system 1000 to the user or to another machine or computer system.

The storage subsystem 1010 stores programming and data constructs that provide the functionality of some or all of the modules and methods described herein. The subsystem 1078 can be graphics processing units (GPUs) or field-programmable gate arrays (FPGAs).

The memory subsystem 1022 used in the storage subsystem 1010 can include a number of memories including a main random access memory (RAM) 1032 for the storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by the file storage subsystem 1036 in the storage subsystem 1010, or in other machines accessible by the processor.

The Bus subsystem 1055 provides a mechanism for letting the various components and subsystems of the computer system 1000 communicate with each other as intended. Although the bus subsystem 1055 is shown schematically as a single bus, alternative implementations of the bus subsystem can use multiple busses.

The computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of the computer system 1000 depicted in FIG. 10 is intended only as a specific example for the purposes of illustrating the preferred embodiments of the present invention. Many other configurations of the computer system 1000 are possible having more or less components than the computer system depicted in FIG. 10.

The computer system 1000 includes GPUs or FPGAs 1078. It can also include machine learning processors hosted by machine learning cloud platforms such as Google Cloud Platform, Xilinx, and Cirrascale. Examples of deep learning processors include Google's Tensor Processing Unit (TPU), rackmount solutions like GX4 Rackmount Series, GX8 Rackmount Series, NVIDIA DGX-1, Microsoft' Stratix V FPGA, Graphcore's Intelligence Processing Unit (IPU), Qualcomm's Zeroth platform with Snapdragon processors, NVIDIA's Volta, NVIDIA's DRIVE PX, NVIDIA's JETSON TX1/TX2 MODULE, Intel's Nirvana, Movidius VPU, Fujitsu DPI, ARM's DynamicIQ, IBM TrueNorth, and others.

We claim as follows:

1. A system for preventing exfiltration of training data by feature reconstruction attacks on model instances trained on the training data during a training job, comprising: a privacy interface that presents a plurality of modulators for a plurality of training parameters; modulators in the plurality of modulators configured to respond to selection commands via the privacy interface to trigger procedural calls that modify corresponding training parameters in the plurality of training parameters for respective training cycles in the training job; a trainer configured to execute the training cycles in dependence on the modified training parameters, and determine a performance accuracy of the model instances for each of the executed training cycles; a differential privacy estimator configured to estimate a privacy guarantee for each of the executed training cycles in dependence on the modified training parameters; a feedback provider configured to visualize, on the privacy interface, the privacy guarantee, the performance accuracy, and the modified training parameters for each of the executed training cycles; and a susceptibility predictor that determines, in dependence on the modified training parameters, susceptibility of the model instances to the feature reconstruction attacks, including model inversion attacks, member inference attacks, and gradient leakage attacks.

2. The system of claim 1, wherein the modulators include a client size modulator configured to receive as input a client size value that specifies a number of available clients to use for execution of a particular training cycle in the training job, and wherein the client size modulator is further configured to trigger a procedure call that causes the trainer to execute the particular training cycle with as many of the model instances as the number of available clients.

3. The system of claim 2, wherein the modulators include a sample size modulator configured to receive as input a sample size value that specifies a subset of the available clients to use for the execution of the particular training cycle, and wherein the sample size modulator is further configured to trigger a procedure call that causes the trainer to execute the particular training cycle with only those model instances that are deployed on the subset of the available clients.

4. The system of claim 3, wherein the modulators include a standard deviation modulator configured to receive as input a sigma value that specifies a standard deviation of additive noise to use for the execution of the particular training cycle, wherein the standard deviation modulator is further configured to trigger a procedure call that causes the trainer to execute the particular training cycle with model instances whose weights are randomly perturbed in dependence on the additive noise, and wherein the additive noise is at least one Gaussian noise and Laplacian noise.

5. The system of claim 4, wherein the modulators include a plurality of standard deviation modulators to specify respective sigma values for respective layers of the model instances.

6. The system of claim 4, wherein the modulators include a norm clipping modulator configured to receive as input a gradient norm bound value that specifies a clipping threshold to use for the execution of the particular training cycle, and wherein the norm clipping modulator is further configured to trigger a procedure call that causes the trainer to execute the particular training cycle with model instances whose gradients are bounded in dependence on the clipping threshold.

7. The system of claim 6, wherein the modulators include a plurality of norm clipping modulators to specify respective gradient norm bound values for respective layers of the model instances.

8. The system of claim 7, wherein the modulators include a exfiltration likelihood modulator configured to receive as input a delta value that specifies a probability of the exfiltration likelihood exceeding the privacy guarantee during the execution of the particular training cycle, and wherein the exfiltration likelihood modulator is further configured to trigger a procedure call that causes the trainer to execute the particular training cycle with model instances whose weights are modified in dependence on the probability.

9. The system of claim 1, wherein the feedback provider is further configured to visualize the susceptibility of the model instances to the feature reconstruction attacks on the privacy interface.

10. The system of claim 1, further configured to comprise a sensitivity calculator configured to calculate a model sensitivity value for each of the executed training cycles in dependence on the modified training parameters.

11. The system of claim 10, wherein the feedback provider is further configured to visualize the model sensitivity value for each of the executed training cycles.

12. The system of claim 1, further configured to comprise a noise scale calculator configured to calculate a noise scale value for each of the executed training cycles in dependence on the modified training parameters.

13. The system of claim 12, wherein the feedback provider is further configured to visualize the noise scale value for each of the executed training cycles.

14. The system of claim 1, wherein the privacy interface is further configured to comprise an update training command generator that is responsive to the selection commands and is configured to a trigger a procedural call that causes the trainer to execute the training cycles in dependence on the modified training parameters.

15. The system of claim 1, wherein the privacy interface is further configured to comprise an update training command generator that is responsive to the selection commands and is configured to trigger a procedural call that causes the trainer to pause and resume the training cycles.

16. The system of claim 1, wherein the privacy interface is further configured to comprise a restart training command generator that is responsive to the selection commands and is configured to trigger a procedural call that causes the trainer to restart the training cycles.

17. The system of claim 2, wherein the privacy interface is further configured to comprise a model publish command generator that is responsive to the selection commands and is configured to a trigger a procedural call that causes the trainer to deploy the model instances to the available clients after the training cycles.

18. A method of preventing exfiltration of training data by feature reconstruction attacks on model instances trained on the training data during a training job, the method including: presenting a plurality of modulators for a plurality of training parameters; responding to selection of modulators in the plurality of modulators to trigger procedural calls that modify corresponding training parameters in the plurality of training parameters for respective training cycles in the training job; executing the training cycles in dependence on the modified training parameters, and determining a performance accuracy of the model instances for each of the executed training cycles; estimating a privacy guarantee for each of the executed training cycles in dependence on the modified training parameters; providing feedback visualization for, the privacy guarantee, the performance accuracy, and the modified training parameters for each of the executed training cycles; and the modified training parameters for each of the executed training cycles; and determining, in dependence on the modified training parameters, susceptibility of the model instances to the feature reconstruction attacks, including model inversion attacks, member inference attacks, and gradient leakage attacks.

19. A non-transitory computer readable storage medium impressed with computer program instructions to prevent exfiltration of training data by feature reconstruction attacks on model instances trained on the training data during a training job, the instructions, when executed on a processor, implement a method comprising: presenting a plurality of modulators for a plurality of training parameters; responding to selection of modulators in the plurality of modulators to trigger procedural calls that modify corresponding training parameters in the plurality of training parameters for respective training cycles in the training job; executing the training cycles in dependence on the modified training parameters, and determining a performance accuracy of the model instances for each of the executed training cycles; estimating a privacy guarantee for each of the executed training cycles in dependence on the modified training parameters; providing feedback visualization for, the privacy guarantee, the performance accuracy, and the modified training parameters for each of the executed training cycles; and determining, in dependence on the modified training parameters, susceptibility of the model instances to the feature reconstruction attacks, including model inversion attacks, member inference attacks, and gradient leakage attacks.

* * * * *